US010033282B2

(12) United States Patent
Babazadeh

(10) Patent No.: US 10,033,282 B2
(45) Date of Patent: Jul. 24, 2018

(54) METHOD AND APPARATUS FOR ESTIMATING LOAD CURRENT FOR SEMI-RESONANT AND RESONANT CONVERTERS

(71) Applicant: Infineon Technologies Austria AG, Villach (AT)

(72) Inventor: Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 107 days.

(21) Appl. No.: 15/008,611

(22) Filed: Jan. 28, 2016

(65) Prior Publication Data

US 2017/0222560 A1   Aug. 3, 2017

(51) Int. Cl.
*H02M 3/335* (2006.01)
*H02M 3/158* (2006.01)
*H02M 1/00* (2006.01)

(52) U.S. Cl.
CPC ....... *H02M 3/33507* (2013.01); *H02M 3/158* (2013.01); *H02M 2001/0009* (2013.01); *H02M 2001/0058* (2013.01); *Y02B 70/1425* (2013.01); *Y02B 70/1491* (2013.01)

(58) Field of Classification Search
CPC .................. H02M 3/33507; H02M 2001/0009
See application file for complete search history.

(56) References Cited

U.S. PATENT DOCUMENTS

| 7,915,874 | B1 | 3/2011 | Cuk | |
|---|---|---|---|---|
| 2011/0285369 | A1 | 11/2011 | Cuk | |
| 2012/0078556 | A1* | 3/2012 | Holmberg | H02M 3/156 702/64 |
| 2012/0249102 | A1 | 10/2012 | Cuk | |
| 2014/0091718 | A1* | 4/2014 | Brinlee | H05B 33/0815 315/185 R |
| 2015/0115911 | A1 | 4/2015 | Parto et al. | |

* cited by examiner

*Primary Examiner* — Jue Zhang
(74) *Attorney, Agent, or Firm* — Murphy, Bilak & Homiller, PLLC

(57) ABSTRACT

A voltage converter includes a variable switching frequency power stage, a passive circuit and a control circuit. The power stage includes a high-side switch and a first low-side switch coupled to the high-side switch at a switching node of the power stage. The passive circuit couples the switching node to an output node of the voltage converter. The control circuit is operable to control cycle-by-cycle switching of the power stage and sample current at a point between the switching node and the output node, the sampled current having a half cycle sinusodial-like shape each switching cycle. For the present switching cycle, the control circuit is operable to calculate an average of the sampled current for the immediately preceding switching cycle and estimate the average sampled current for the present switching cycle based on the average sampled current calculated for the immediately preceding switching cycle.

21 Claims, 10 Drawing Sheets

METHOD AND APPARATUS FOR ESTIMATING LOAD CURRENT FOR SEMI-RESONANT AND RESONANT CONVERTERS

TECHNICAL FIELD

The present application relates to semi-resonant and resonant converters, in particular estimating load current for semi-resonant and resonant converters.

BACKGROUND

Resonant and semi-resonant DC-DC converters, including isolated and non-isolated topologies, are used in a variety of applications such as telecommunications, processors, etc. because of their zero-voltage (current) switching characteristic and their ability to utilize parasitic components. Among numerous topologies, the semi-resonant converter with transformer/tapped-inductor is an attractive topology for high voltage conversion ratio without isolation. Lower cost and higher efficiency are the main advantages of such converters over other solutions.

The output current of many resonant and semi-resonant DC-DC converters has a half cycle sinusodial-like shape each switching cycle. A classic example of such a sinusodial-like output current occurs in discontinuous conduction mode (DCM) in which current through the output inductor falls to zero during part of the switching period. Many resonant and semi-resonant DC-DC converters also have a variable switching frequency such that the switching period can vary from cycle to cycle. For these types of resonant and semi-resonant converters with sinusodial-like output current and variable switching frequency, it is difficult to obtain the cycle average value of the output current which is equal to the load current in semi-resonant converters. The cycle average is used for adaptive voltage positioning (AVP), phase current balancing and phase dropping/adding in multi-phase systems. Because of the sinusodial-like shape of the output current, conventional low pass filtering techniques for obtaining the cycle average value of the output current are not adequate, since very low bandwidth filters would be needed for obtaining the average value of the output current. Very low bandwidth filters add latency to the control loop and may degrade the transient performance of the converter. In addition, very low bandwidth filters yield an inaccurate total current which is obtained by summing the filtered values in each channel, especially at higher load frequency transients. Also, very low bandwidth filters are not suitable for use in peak current limit control or other control mechanisms utilizing the current information, nor are they suitable for use in current balancing/sharing control.

As such, there is a need for an improved technique for obtaining the cycle average value of output current for resonant and semi-resonant DC-DC converters having a variable switching frequency and output current having a sinusodial-like shape.

SUMMARY

According to an embodiment of a voltage converter, the voltage converter comprises a variable switching frequency power stage, a passive circuit and a control circuit. The power stage includes a high-side switch and a first low-side switch coupled to the high-side switch at a switching node of the power stage. The passive circuit couples the switching node to an output node of the voltage converter. The control circuit is operable to control cycle-by-cycle switching of the power stage and sample current at a point between the switching node and the output node, the sampled current having a half cycle sinusodial-like shape each switching cycle. For the present switching cycle, the control circuit is operable to calculate an average of the sampled current for the immediately preceding switching cycle and estimate the average sampled current for the present switching cycle based on the average sampled current calculated for the immediately preceding switching cycle.

According to an embodiment of a method of current sensing for a voltage converter which includes a power stage having a high-side switch and a first low-side switch coupled to the high-side switch at a switching node of the power stage and a passive circuit coupling the switching node to an output node of the voltage converter, the power stage having a variable switching frequency, the method comprises: sampling current at a point between the switching node and the output node, the sampled current having a half cycle sinusodial-like shape each switching cycle; and for the present switching cycle, calculating an average of the sampled current for the immediately preceding switching cycle and estimating the average sampled current for the present switching cycle based on the average sampled current calculated for the immediately preceding switching cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 1 illustrates a block diagram of an embodiment of a voltage converter having a variable switching frequency and a sampled current with a half cycle sinusodial-like shape, and a current estimator for calculating the cycle average of the sampled current.

FIG. 2 illustrates the voltage converter and current estimator in more detail, according to an embodiment.

FIGS. 3 and 4 illustrate various waveforms associated with operation of the voltage converter.

FIG. 5 illustrates the voltage converter and current estimator in more detail, according to another embodiment.

FIG. 6 illustrates a mapping between the equivalent model of the transformer shown in FIGS. 2 and 5 to the physical transformer.

FIGS. 7 and 8 illustrate various waveforms associated with operation of the current estimator.

FIG. 9 illustrates waveforms associated with the current estimator making adjustments to the cycle average sampled current, according to an embodiment.

FIG. 10 illustrates waveforms associated with the current estimator making adjustments to the cycle average sampled current, according to another embodiment.

DETAILED DESCRIPTION

Embodiments described herein obtain an accurate cycle average of sampled current of a resonant or semi-resonant DC-DC converter having a variable switching frequency. The average sampled current is estimated using information taken from a low-side sync switch or any other sense element through which the current to be sampled flows. The average sampled current for the immediately preceding switching cycle is calculated, and the average sampled current for the present switching cycle is estimated based on the average sampled current calculated for the immediately preceding switching cycle. The current estimate can be adjusted to improve accuracy. Latency is minimized to a maximum one cycle in one embodiment and even less in another embodiment. The techniques described herein are suitable for handling high frequency load transients, are easy to implement in digital/analog control, do not require digital/analog low pass filtering, provide accurate total current estimate, are suitable for current mode control schemes, are suitable for peak current limit control, are suitable for current balance control in multi-phase applications, and allow for adjusting the average current value with variable frequency operation.

Figure 1:
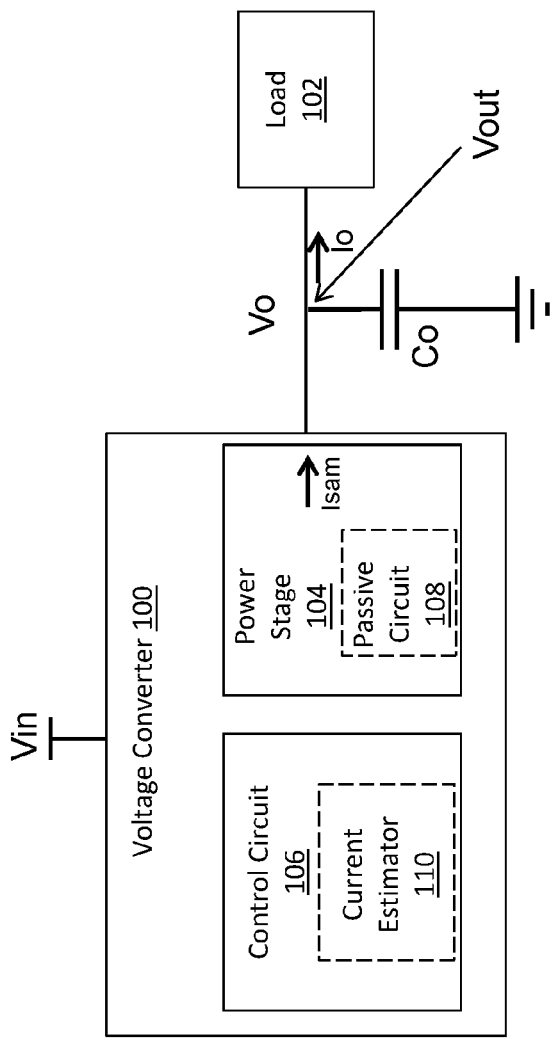

FIG. 1 illustrates an embodiment of a voltage converter 100 having a variable switching frequency (Fsw) and an output current (Io) supplied to a load 102. The voltage converter 100 includes a power stage 104 which converts an input voltage (Vin) to an output voltage (Vo) at an output node Vout under the control of a control circuit 106, so as to deliver the output current Io to the load 102 through a passive circuit 108 included in or associated with the power stage 104. The type of passive circuit 108 depends on the topology of the voltage converter 100, which can have an isolated or non-isolated topology and be resonant or semi-resonant. Any standard voltage converter can be used so long as the converter has a variable switching frequency and a sampled current (Isam) with a half cycle sinusodial-like shape i.e. a shape that resembles half a sine wave. For example, the voltage converter 100 can be a semi-resonant converter having a transformer/tapped-inductor for coupling an LC tank of the passive circuit 108 to an output capacitor Co.

A current estimator 110 included in or associated with the control circuit 106 obtains an accurate cycle average of the sampled current Isam each switching cycle. Because the voltage converter 100 has a variable switching frequency and a sampled current Isam with a half cycle sinusodial-like shape, low pass filtering to obtain the cycle average sampled current is not employed, since a very low bandwidth filter would be needed. Instead, the current estimator 110 calculates the average sampled current for the immediately preceding switching cycle [n−1] and estimates the average sampled current for the present switching cycle [n] based on the average sampled current calculated for the immediately preceding switching cycle [n−1]. The average of the sampled current Isam approximately equals the output current Io delivered to the load. The control circuit 106 can adjust the current estimate to improve accuracy as described in more detail later.

Figure 2:
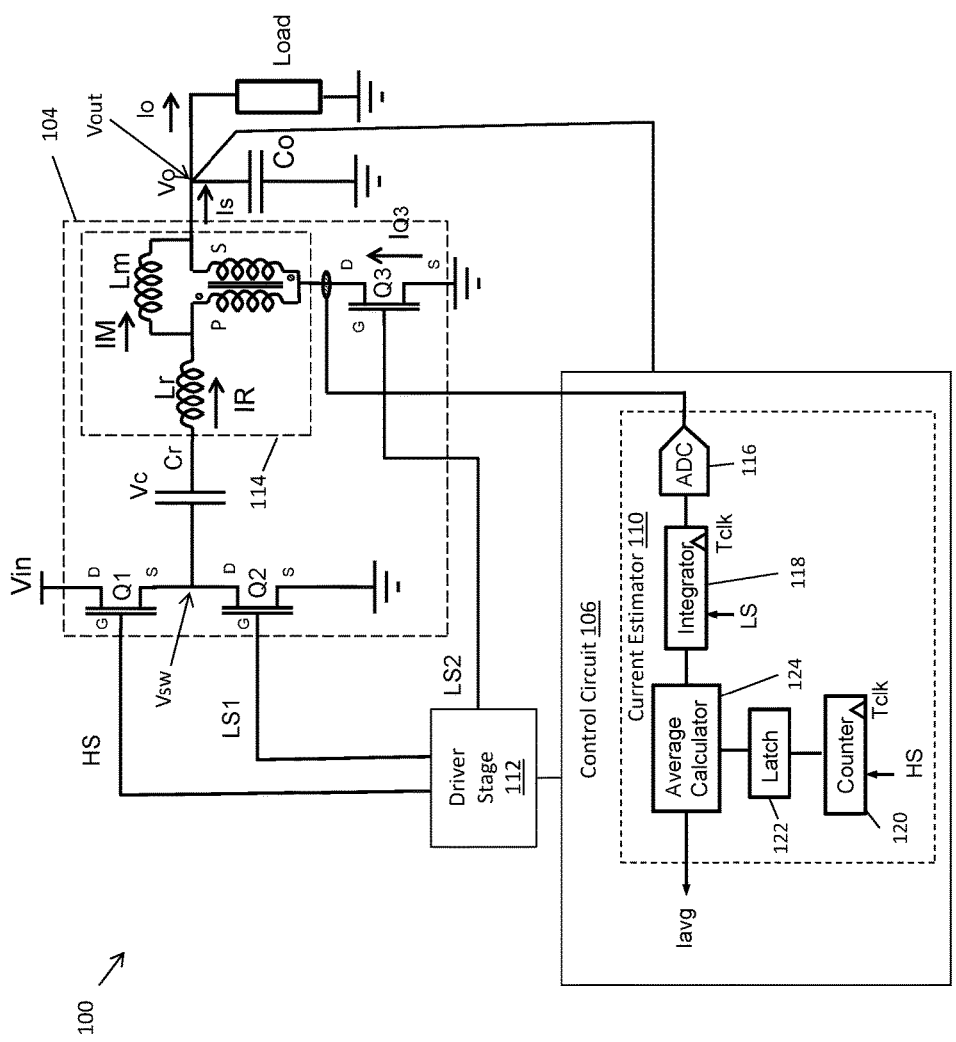

FIG. 2 illustrates an embodiment of the voltage converter 100 and the current estimator 110 shown in FIG. 1. According to this embodiment, the voltage converter 100 is a hybrid pulse-width modulation/resonant voltage converter in which a resonance occurs during the off time (Toff) of the high-side or control switch Q1 of the power stage 104. The hybrid pulse-width modulation/resonant voltage converter is well-suited for voltage converter applications requiring high speed switching and relatively large step-down voltage conversion ratios.

The power stage 104 of the hybrid pulse-width modulation/resonant voltage converter includes a high-side power switch Q1, and first and second low-side power switches Q2, Q3. A driver stage 112 is provided for driving the high-side power switch Q1 and the low-side power switches Q2, Q3 of the power stage 104. The driver stage 112 and the power stage 104 can be integrated on the same semiconductor die, or provided as separate dies. The power switches Q1, Q2, Q3 can be integrated on the same semiconductor die, or provided as separate dies.

The high-side power switch Q1 and the low-side power switches Q2, Q3 may be implemented as silicon or other group IV based metal-oxide-semiconductor field-effect transistors (MOSFETs), for example. Accordingly, each power switch Q1, Q2, Q3 is shown to include drain (D), source (S), and gate (G). The high-side power switch Q1, and the low-side power switches Q2, Q3 are depicted as silicon or other group IV FETs in the exemplary implementation shown by FIG. 2 for ease and conciseness of description. However, it is emphasized that such implementations are merely exemplary, and the inventive principles disclosed herein are broadly applicable to a wide range of applications, including voltage converters implemented using other group IV material based, or group III-V semiconductor based, power switches. It is further noted that as used herein, the phrase "group III-V" refers to a compound semiconductor including at least one group III element and at least one group V element. By way of example, a group III-V semiconductor may take the form of a III-Nitride semiconductor that includes nitrogen and at least one group III element. In FIG. 2, MOSFETs have been used to represent the power switches Q1, Q2, Q3. However, other type of switches, such as bipolar junction transistors (BJTs), insulated-gate bipolar transistors (IGBTs), gallium nitride (GaN) based switches, for example, may be used as well.

As shown in FIG. 2, the control circuit 106, which controls the switching of power switches Q1, Q2, Q3, is coupled to the driver stage 112. In addition, the control circuit 106 also is coupled to the drain of the second low-side power switch Q3, and to the output node Vout of the voltage converter 100. Also shown in FIG. 2 are the switch node Vsw of the voltage converter, resonance capacitor (Cr), leakage inductance (Lr), magnetizing inductance (Lm), output capacitor (Co), and transformer 114, which can be implemented as a transformer or a center-tapped inductor, having N turns (N1+N2) and including a primary winding (P) with N1 turns and a secondary winding (S) with N2 turns.

As further shown in FIG. 2, the high-side power switch Q1 receives input voltage Vin at the drain of Q1. The source of the high-side power switch Q1 is coupled to the drain of the first low-side power switch Q2 at the switch node Vsw of the converter 100. The first low-side power switch Q2 is in turn coupled between the switch node Vsw and ground, i.e., has its source coupled to ground. As also shown in FIG. 2, the second low-side power switch Q3 has its drain coupled between the primary winding P and the secondary winding S of the transformer 114, and has its source coupled to ground. According to the exemplary implementation shown in FIG. 2, the high-side power switch Q1 is configured as a control switch, the first low-side power switch Q2 is configured as a resonance switch, and the second low-side power switch Q3 is configured as a synchronous (sync) switch of the voltage converter 100.

Figure 3:
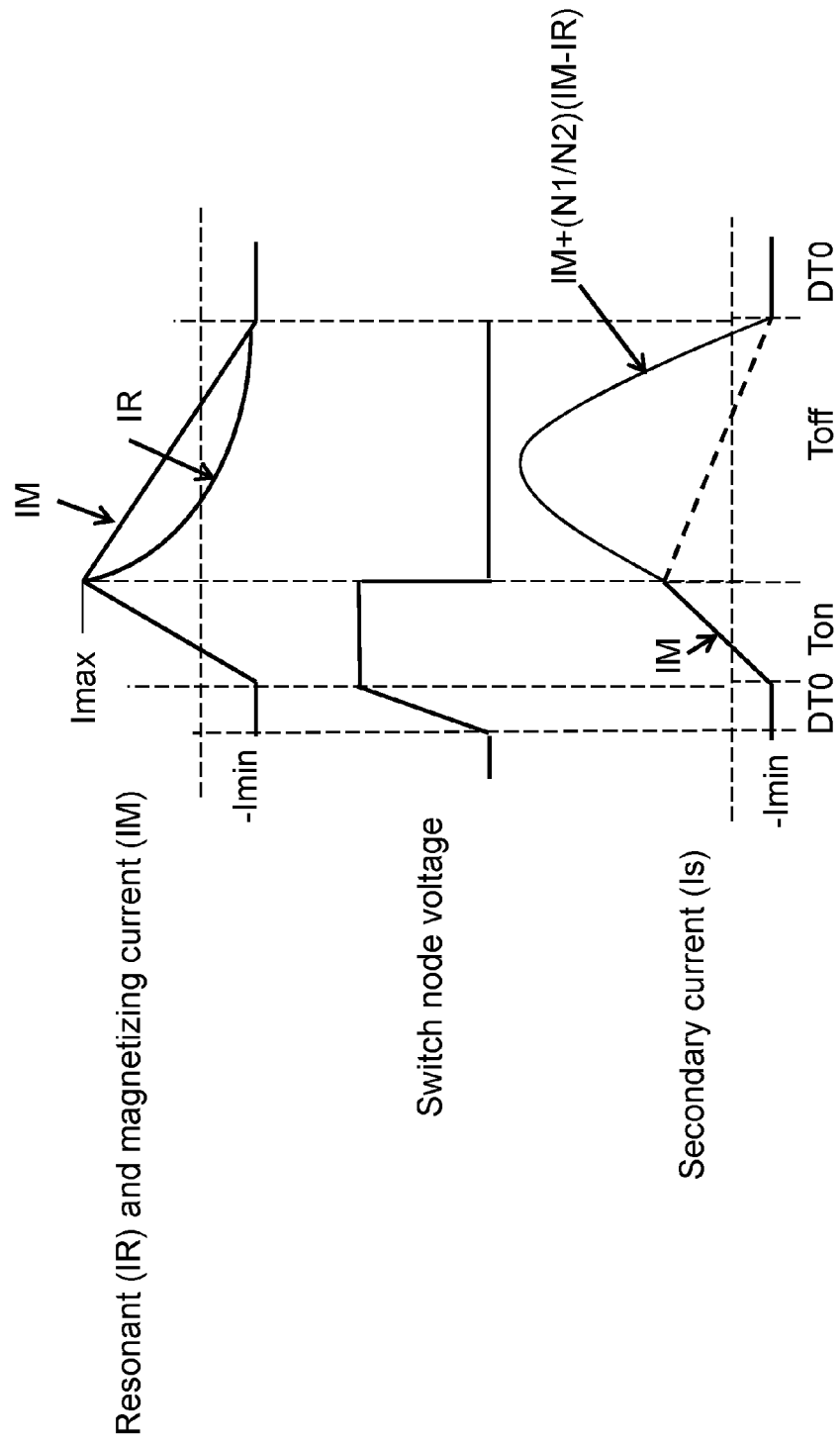

The semi-resonant/hybrid voltage converter circuit configuration shown in FIG. 2 is merely exemplary. Semi-resonant/hybrid voltage converters can be implemented using a number of different circuit configurations, including those utilizing split resonance capacitors and those utilizing an isolation transformer, for example. The inventive principles disclosed herein may be readily adapted to any semi-resonant/hybrid voltage converter including a high-side power switch, and first and second low-side power switches, regardless of the particular circuit configuration employed, and more generally to any voltage converter having a variable switching frequency and a sampled current Isam with a half cycle sinusodial-like shape as shown in FIG. 3. The sampled current Isam corresponds to the secondary current Is of the transformer 114 according to the embodiment shown in FIG. 2.

FIG. 3 is a plot diagram illustrating the secondary current Is, the voltage at the switch node Vsw, and the resonant and magnetizing currents IR, IM of the voltage converter 100 during operation. The secondary current Is and the magnetizing current IM are at a minimum negative value −Imin and the switch node voltage is at or near ground potential at the start of the dead time DT0 just prior to the next switching cycle. All power switches are off at the beginning of DT0, e.g. HS=0, LS1=0 and LS2=0 for the gate signals of the standard MOSFETs shown in FIG. 2. Current Imin charges the output capacitance of Q2 and causes the switch node voltage to rise to a level near Vin during DT0. At the end of dead time DT0, the high-side power switch Q1 is turned on, i.e., the "on time" or "Ton" as used herein, and the first and second low-side power switches Q2, Q3 remain off, e.g. by setting HS=1, LS1=0 and LS2=0 for the gate signals of the standard MOSFETs shown in FIG. 2. During Ton, the switch node voltage is tied to Vin through the high-side power switch Q1 and the secondary current Is and the magnetizing current IM of the voltage converter 100 rise in a linear manner e.g. until the magnetizing current IM reaches a maximum value Imax. The magnetizing current IM associated with the LC tank formed by resonance capacitor Cr, leakage inductance Lr and magnetizing inductance Lm accounts for the rise in the secondary current Is during Ton.

During the next interval of the switching cycle, the high-side power switch Q1 is turned off, i.e., the "off time" or "Toff" as used herein, and the first and second low-side power switches Q2, Q3 are turned on, e.g. by setting HS=0, LS1=1 and LS2=1 for the gate signals of the standard MOSFETs shown in FIG. 2. The switch node voltage drops to its minimum value when Q1 is off and Q2 and Q3 are on, because the switch node Vsw is coupled to ground though Q2. Also, a resonance is formed between resonance capacitor Cr and leakage inductance Lr during Toff. Leakage inductance Lr may be a purely parasitic inductance of the transformer, or may include an inductor component in combination with such a parasitic inductance. Moreover, leakage inductance Lr is variable inductance because its inductance value can vary over temperature, as well as over variations in the transformer 114.

The resonance formed between resonant capacitor Cr and leakage inductance Lr during the off time of the high-side power switch Q1 results in a resonant current (IR) flowing through the secondary winding S of the transformer 114 which charges output capacitor Co. If the off time of the high-side power switch Q1 is optimized with respect to the resonant frequency, the second low-side power switch Q2 can be turned off when its current is very small or substantially zero. The secondary current Is rises during Toff due to the secondary side current of the transformer 114 which equals IM+(N1/N2)(IM−IR), where N1 is the number of primary side winding turns and N2 is the number of secondary winding turns of the transformer 114. The point at which IR crosses IM signals to the control circuit 106 the end of the present switching cycle, so that the control circuit 106 knows when to force the voltage converter 100 into next cycle starting with dead time DT0 in which power switches Q1, Q2, Q3 are turned off.

Figure 4:
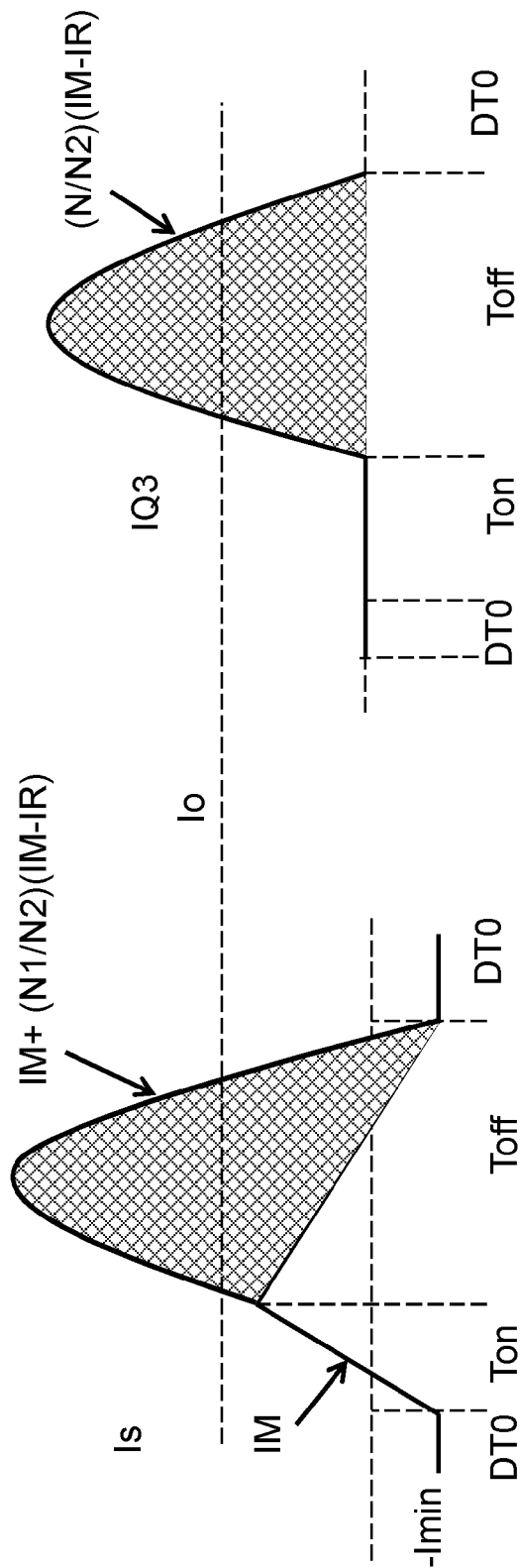

FIG. 4 is a plot diagram for one switching cycle comparing the secondary Is of the voltage converter 100 with the current (IQ3) of the second low-side power switch Q3, which is connected to the secondary winding S of the transformer 114. Current IQ3 of the second low-side power switch Q3 equals (N/N2)(IM−IR), where N is the turns ratio of the transformer and N2 is the number of secondary winding turns, IM is the magnetizing current of the passive circuit 108 and IR is the resonant current of the passive circuit 108. The output current Io relates to the average current $\langle IQ3 \rangle$ of the second low-side power switch Q3 and the average $\langle Is \rangle$ of the secondary current as follows:

$$Io = \langle Is \rangle = \langle IQ3 \rangle = \langle IM+(N1/N2)(IM-IR) \rangle = \langle (N/N2)(IM-IR) \rangle \quad (1)$$

where $\langle \ \rangle$ denotes the average value.

The secondary current Is and the current IQ3 of the second low-side power switch Q3 both have a half cycle sinusodial-like shape for each switching cycle as shown in FIG. 4. The cross-hatched part of each current plotted in FIG. 4 represents the cycle average value of the respective current for the present switching cycle current and corresponds to the output current Io.

Figure 5:
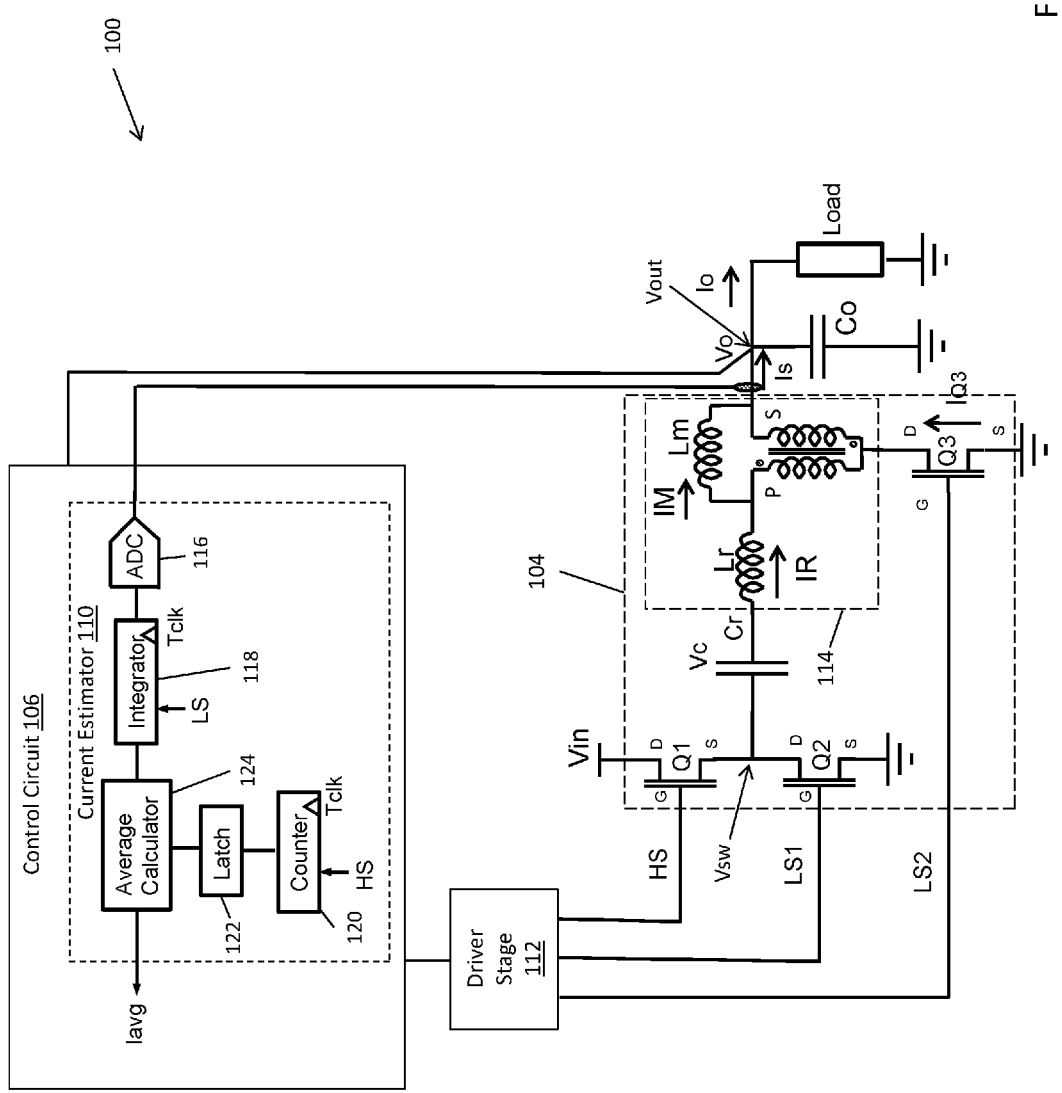
Figure 6:
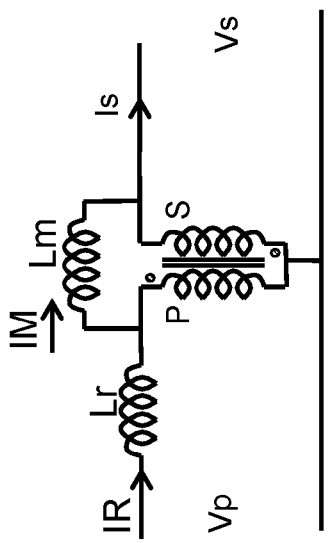
Figure 6:
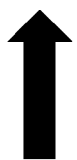
Figure 6:
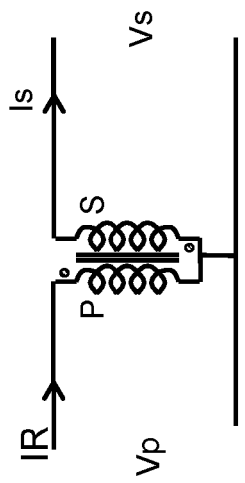

The current estimator 110 included in or associated with the control circuit 106 obtains an accurate cycle average value of the secondary current Is according to the embodiment illustrated in FIG. 2. For the present switching cycle [n], the current estimator 110 calculates an average sampled current $\langle Is \rangle$ for the immediately preceding switching cycle [n−1] and estimates the average sampled current $\langle Is \rangle$ for the present switching cycle based on the average sampled current calculated for the immediately preceding switching cycle [n−1]. FIG. 5 shows a similar embodiment in which the current estimator 110 samples the current IQ3 of the second low-side power switch Q3 instead of the secondary current Is, to obtain an accurate cycle average sampled current which corresponds to the output current Io. FIG. 6 maps the equivalent model of the transformer 114 shown in FIGS. 2 and 5 to the physical transformer 114, where Vp is the primary voltage and Vs is the secondary voltage.

In both cases, the current estimator 110 includes an ADC (analog-to-digital converter) 116 for digitally sampling the measured current (Is or IQ3) and an integrator 118 for integrating the digitally sampled current values while the high-side switch Q1 is off and the first low-side switch Q2 is on. For example, the integrator 118 can be triggered by the rising edge of the signal LS1 which is applied to the gate of the first low-side power switch Q2 and which represents the beginning of Toff for the present switching cycle. The integrator 118 has a predetermined sampling rate Tclk which is set so that the number of samples taken each switching cycle ensures the average sampled current calculated for each switching cycle meets an accuracy threshold.

The current estimator 110 also includes a counter 120 for measuring the period of the voltage converter 100, which can vary from cycle-to-cycle. The counter 120 is reset at the rising edge of the signal HS, which is applied to the gate of the high-side power switch Q1 and represents the beginning of Ton for the present switching cycle. The final value of the counter 120 is stored by a latch 122 and used for the next switching cycle.

The current estimator 110 further includes an average calculator 124 for calculating an accurate cycle average of the sampled current Is or IQ3, both of which correspond to the output current Io. The average calculator 124 divides the integrated current from the integrator 118 by the measured period of the switching cycle which is a function of the counter value stored in the latch 122. The ADC 116, integrator 118, counter 120, latch 122 and average calculator 124 can be implemented digitally as part of the converter control circuit 106. Operation of the current estimator 110 is described next in more detail with reference to FIGS. 7 and 8.

Figure 7:
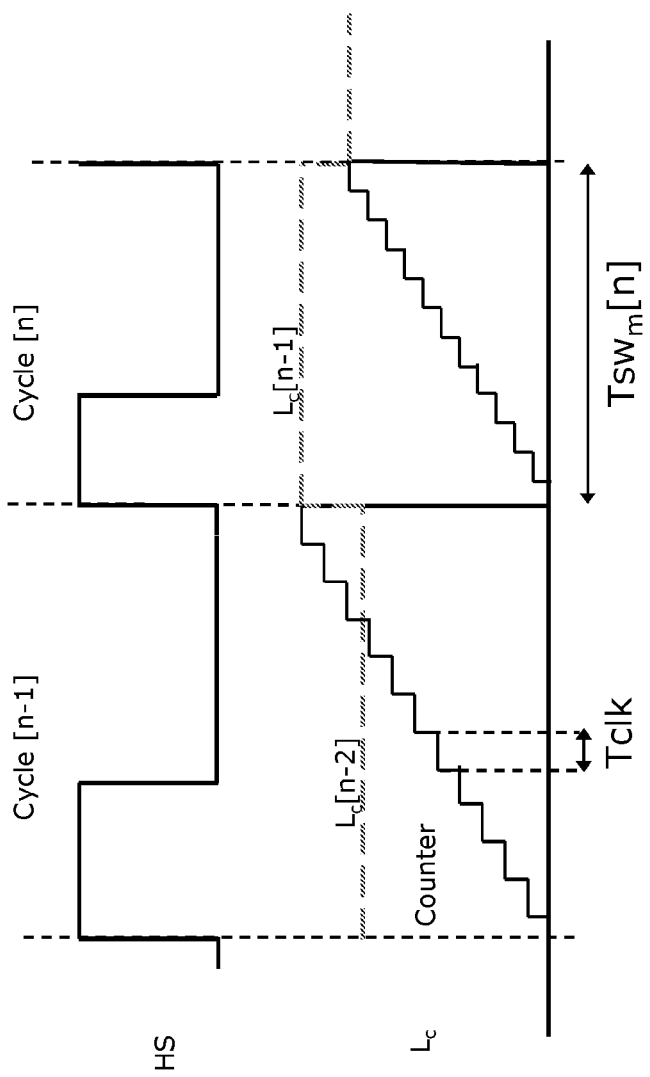

FIG. 7 illustrates the counter output and its latched value during the present switching cycle [n] and during the immediately preceding switching cycle [n−1], as a function of the signal HS applied to the gate of the high-side power switch Q1. The final value of the counter 120 is latched (Lc) and used for calculating the switching period. The counter 120 is reset at the rising edge of HS, which corresponds to the beginning of Ton for the corresponding switching cycle. The counter 120 increments its output responsive to the input clock signal $T_{clk}$. The counter output is stored by the latch 122 at the end of each switching cycle. The latched value is then used to measure the period $T_{SWm}$ of each switching cycle, which can vary from cycle-to-cycle as previously described herein. The period $Tsw_m[n-1]$ of switching cycle [n−1] is given by:

$$Tsw_m[n-1] = L_c[n-1] * T_{clk} \qquad (2)$$

where $L_c[n-1]$ is the last value of the counter 120 at the end of switching cycle [n−1] and $T_{clk}$ is the frequency of the input clock signal to the counter 120.

At the beginning of the next switching cycle [n], the period $Tsw_m[n-1]$ of the immediately preceding switching cycle [n−1] is already known. As such, the period $Tsw_m[n-1]$ of the immediately preceding switching cycle [n−1] can be used as an estimate of the period $Tsw_m[n]$ of the present switching cycle [n] as given by:

$$Tsw_m[n] = L_c[n-1] * T_{clk} \qquad (3)$$

The dashed line in FIG. 7 represents the calculated period of the immediately preceding switching cycle which is used as an estimate of the period of the present switching cycle e.g. Lc[n−2] for switching cycle [n], Lc[n−1] for switching cycle [n], etc. The value of the calculated period can change from cycle-to-cycle as shown in FIG. 7 due to the variable switching frequency of the converter 100. Latency is minimized to a maximum one cycle according to this embodiment.

Figure 8:
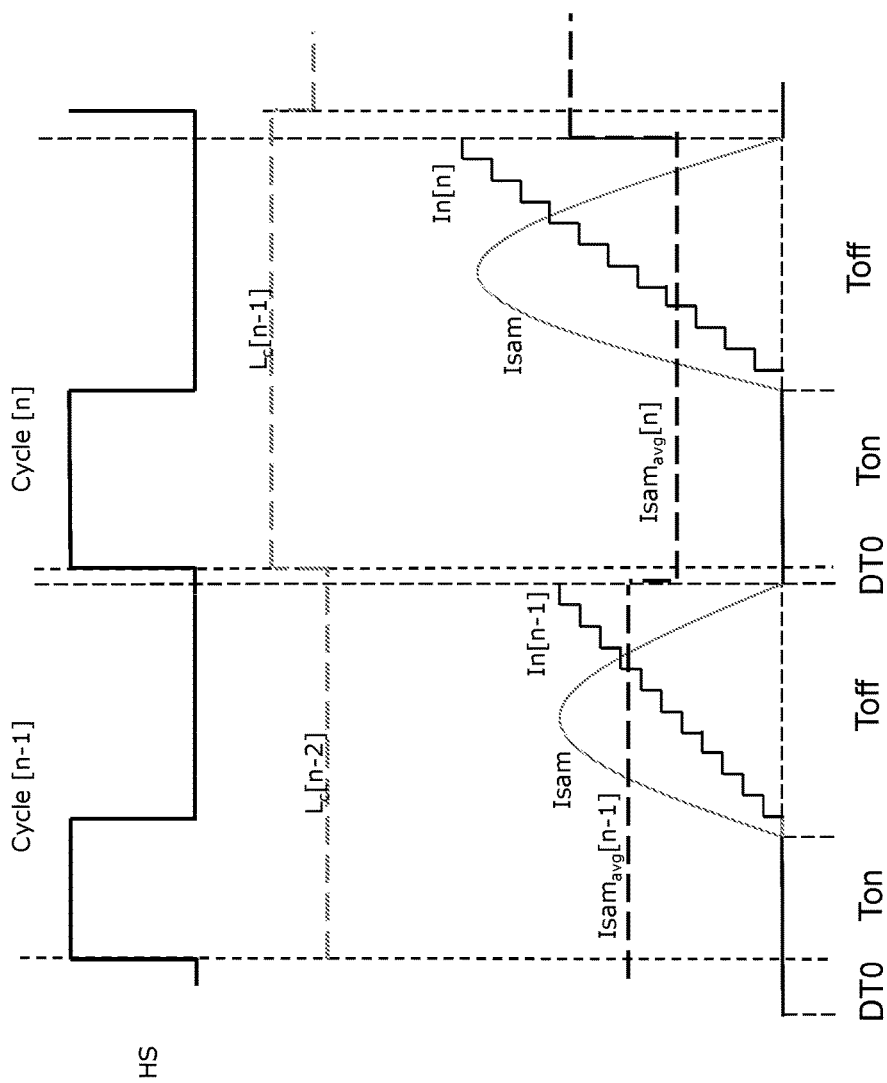

FIG. 8 illustrates estimating the average sampled current ($Isam_{avg}$) of either the low-side switch current IQ3 or of the secondary current Is over two successive switching cycles [n−1] and [n]. The integrator 118 of the current estimator 110 includes a counter which is reset at the falling edge of HS, which corresponds to the beginning of Toff for the corresponding switching cycle. The integrator output In increments responsive to the clock input signal $T_{clk}$, and corresponds to the measured current IQ3/Is due to the half cycle sinusodial-like shape of the sampled as shown in FIG. 8. The digitally sampled current values counted by the integrator counter can correspond to the current IQ3 of low-side switch Q3 in accordance with the embodiment illustrated in FIG. 2, with the secondary current Is in accordance with the embodiment illustrated in FIG. 5, or in accordance with any other current measurement sampled at a point between the switching node Vsw and the output node Vout and the average of which corresponds to the converter output current Io. The current can be measured at any point between the switch node Vsw and the output capacitor Co, where the average value of the sensed current is equal or proportional to the load current Io. For example, the current can be measured by ensuing Rdson (on-state resistance) of Q3 or by using a current mirror that mirrors IQ3. DCR sensing or measuring the voltage across a resistor for sensing Is are other standard options.

The integrator 118 also includes a latch for capturing the final value In of the integrator counter at the end of each switching cycle [n−1], [n], etc., i.e. the counter value just before the beginning of the next dead time period DT0. The final value In[n−1] of the integrator counter stored in the integrator latch for the immediately preceding switching cycle [n−1] is used during the next switching cycle [n] to calculate the average sampled current $Isam_{avg}[n]$ for switching cycle [n] as given by:

$$Isam_{avg}[n] = \frac{In[n-1] \times Tclk}{Lc[n-1] \times Tclk} = \frac{In[n-1]}{Lc[n-1]} \qquad (4)$$

where $L_c[n-1]*T_{clk}$ is the period of the immediately preceding switching cycle [n−1] as given by equation (3).

The dashed line in FIG. 8 represents the estimated average sampled current $Isam_{avg}$ for each switching cycle [n−1], [n], etc. calculated by the average calculator 124 of the current estimator 110 in accordance with equation (4). As such, the average cycle current calculated for the immediately preceding switching cycle is used as an estimate for the present switching cycle e.g. $Isam_{avg}[n-2]$ is used as the average cycle current for switching cycle [n−1], $Isam_{avg}[n-1]$ is used as the average cycle current for switching cycle [n], etc.

The value of the estimated average sampled current $Isam_{avg}$ can change from cycle-to-cycle as shown in FIG. 8 due to the variable switching frequency of the voltage converter 100. Again, latency is minimized to a maximum one cycle according to this embodiment. Latency can be reduced by adjusting the average sampled current estimated for the present switching cycle, thereby increasing accuracy of the average sampled current estimate.

Figure 9:
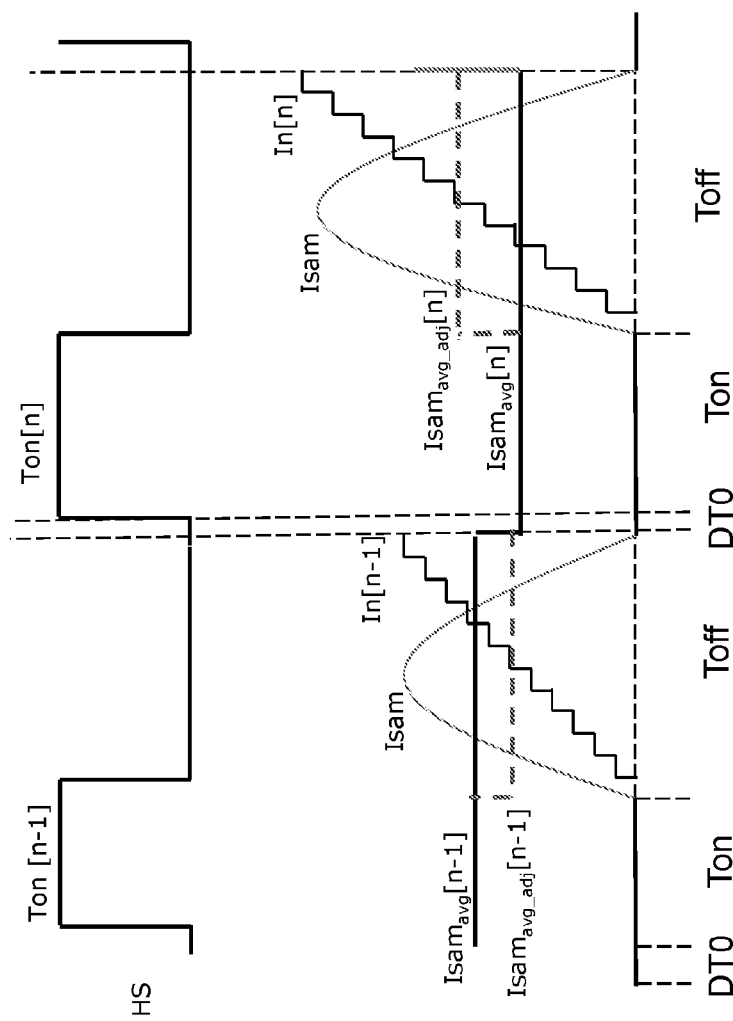

FIG. 9 illustrates an embodiment in which the control circuit 106 adjusts the average sampled current estimate $Isam_{avg}$, thereby reducing latency and improving accuracy. According to this embodiment, the control circuit 106 adjusts the average sampled current estimate $Isam_{avg}[n]$ of the present switching cycle [n] based on the on time Ton[n] of the present switching cycle and the on time of Ton[n−1] of the immediately preceding switching cycle. If the on time Ton[n] of the present switching cycle [n] equals the on time Ton[n−1] of the immediately preceding switching cycle [n−1], then no adjustment is made to $Isam_{avg}[n]$. Relatively equal on-time durations in this case indicates that the successive switching cycles have approximately the same average current and therefore no adjustment is warranted. Accordingly, the average sampled current estimate $Isam_{avg}[n-1]$ calculated for the immediately preceding switching cycle [n−1] is an accurate approximation of the sampled current for the present switching cycle.

If, however, Ton[n] and Ton[n−1] are different, the sampled current for the present switching cycle [n] is different than the sampled current for the immediately preceding switching cycle [n−1]. For example, if Ton[n]> Ton[n−1], then the actual average current for switching cycle [n] was higher than calculated. Conversely, if Ton[n]< Ton[n−1], then the actual average current for switching cycle [n] was lower than calculated.

The control circuit 106 can determine if the high-side switch Q1 is on for a different duration of time in the present switching cycle [n] than in the immediately preceding switching cycle [n−1]. This information is known and readily available during the present switching cycle [n−1] as part of standard voltage converter control. The control circuit 106 can then adjust the average sampled current estimated for the present switching cycle [n] as a function of the difference in on-time for the high-side switch Q1 at the end of Ton time. In one embodiment, the adjusted average sampled current $Isam_{avg\_adj}[n]$ for the present switching cycle [n] is determined as given by:

$$Isam_{avg\_adj}[n]=Isam_{avg}[n]+Kp(Ton[n]-Ton[n-1]) \quad (5)$$

According to this embodiment, the control circuit 106 adjusts the average sampled current $Isam_{avg}[n]$ estimated for the present switching cycle [n] as a function of the difference in on-time for the high-side switch Q1 by multiplying the difference in on-time for the high-side switch Q1 by a weighting factor Kp so as to compute an adjustment value, and adding the adjustment value to the average sampled current $Isam_{avg}[n]$ estimated for the present switching cycle [n]. If there is no difference or if the difference is within some predetermined margin, then $Isam_{avg\_adj}[n]=Isam_{avg}[n]$ and no adjustment is made. The dashed line in FIG. 9 represents the adjusted average sampled current $Isam_{avg\_adj}$ for each switching cycle e.g. as determined in accordance with equation (5). Other scaling techniques can be employed by the control circuit 106 to adjust the average sampled current estimated for the present switching cycle as a function of on-time.

Figure 10:
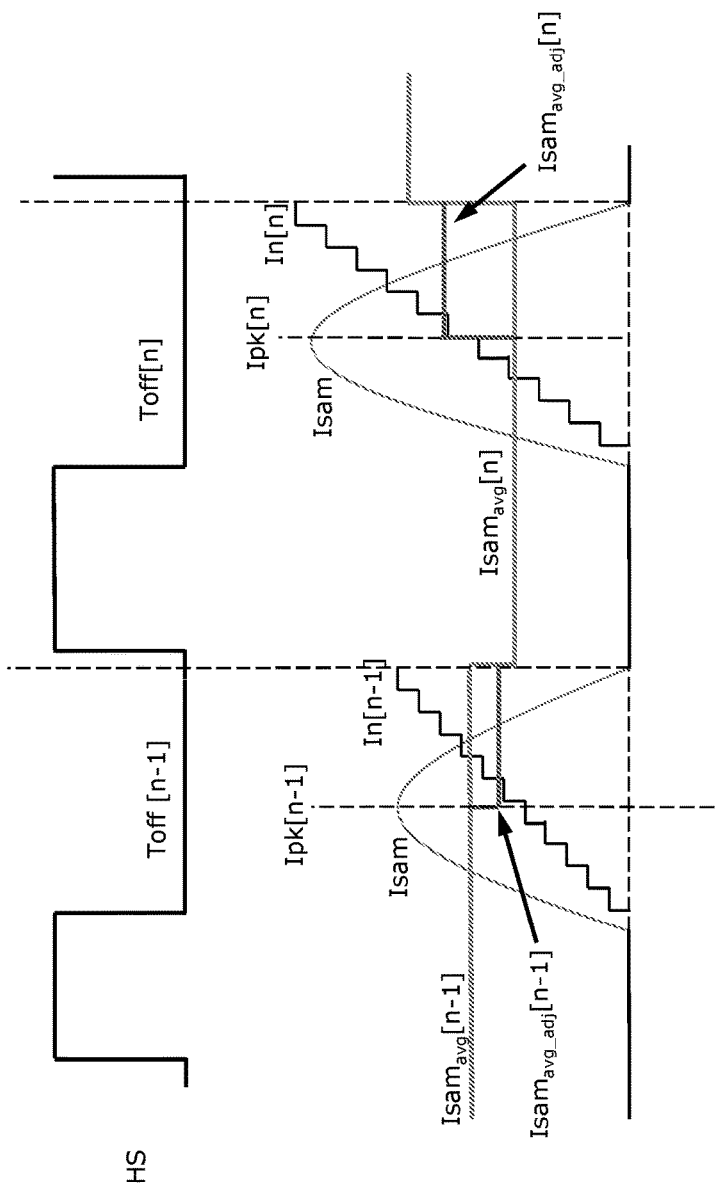

FIG. 10 illustrates another embodiment in which the control circuit 106 adjusts the average sampled current estimate $Isam_{avg}$, thereby reducing latency and improving accuracy. According to this embodiment, the control circuit 106 adjusts the average sampled current estimate $Isam_{avg}[n]$ of the present switching cycle [n] based on the peak current Ipk[n] measured for the present switching cycle [n] and the peak current Ipk[n−1] measured for the immediately preceding switching cycle [n−1]. If the peak current Ipk[n] measured for the present switching cycle [n] approximately equals the peak current Ipk[n−1] measured for the immediately preceding switching cycle [n−1], then no adjustment is made to $Isam_{avg}[n]$. Relatively equal peak currents in this case indicates that the successive switching cycles have approximately the same average current and therefore no adjustment is warranted. Accordingly, the average sampled current estimate $Isam_{avg}[n-1]$ calculated for the immediately preceding switching cycle [n−1] is an accurate approximation of the sampled current for the present switching cycle [n].

If, however, Ipk[n] and Ipk[n−1] differ by a certain amount or percentage, the sampled current for the present switching cycle [n] is different than the sampled current measured for the immediately preceding switching cycle [n−1]. For example, if Ipk[n]>Ipk[n−1], then the actual average current for switching cycle [n] was higher than calculated. Conversely, if Ipk[n]<Ipk[n−1], then the actual average current for switching cycle [n] was lower than calculated.

The control circuit 106 can determine if the peak current Ipk[n] measured for the present switching cycle [n] is different than the peak current Ipk[n−1] measured for the present switching cycle [n]. This information is readily ascertainable from the sample current values generated by the integrator 118 of the current estimator 110. The control circuit 106 adjusts the average sampled current estimated for the present switching cycle [n] as a function of the difference in the peak currents. In one embodiment, the adjusted average sampled current $Isam_{avg\_adj}[n]$ for the present switching cycle [n] is determined as given by:

$$Isam_{avg\_adj}[n]=Isam_{avg}[n]+Kp(PhC[n]|peak-PhC[n-1]|peak) \quad (6)$$

where PhC[n]|peak is the peak current measured by the ADC 116 of the current estimator 110 at approximately Toff[n]/2 for the present switching cycle [n], and PhC[n−1]|peak is the peak current measured by the ADC 116 at approximately Toff[n−1]/2 for the immediately preceding switching cycle [n−1].

According to this embodiment, the control circuit 106 adjusts the average sampled current $Isam_{avg}[n]$ estimated for the present switching cycle [n] as a function of the difference in measured peak current by multiplying the difference in the current peaks by a weighting factor Kp so as to compute an adjustment value, and adding the adjustment value to the average sampled current $Isam_{avg}[n]$ estimated for the present switching cycle [n]. If there is no difference or if the difference is within some predetermined margin, then $Isam_{avg\_adj}[n]=Isam_{avg}[n]$ and no adjustment is made. Other scaling techniques can be employed by the control circuit 106 to adjust the average sampled current estimated for the present switching cycle as a function of peak current.

The control circuit 106 can employ both the on-time based approach illustrated in FIG. 9 and the peak current based approach illustrated in FIG. 10 to adjust the average sampled current $Isam_{avg}[n]$ estimated for the present switching cycle [n], so that $Isam_{avg}[n]$ is adjusted as a function of on-time and measured peak current.

In general, the cycle average current $Isam_{avg}$ calculated by the current estimator 110 can be used by the control circuit 106 for various purposes such as adaptive voltage positioning (AVP), phase current balancing, phase adding/dropping, peak current limit, etc. These techniques are well known techniques in the voltage converter art, and therefore no further explanation is given in this regard.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:
   a power stage comprises a high-side switch and a first low-side switch coupled to the high-side switch at a switching node of the power stage;
   a passive circuit coupling the switching node to an output node of the voltage converter; and
   a control circuit operable to control cycle-by-cycle switching of the power stage and sample current at a point between the switching node and the output node, the sampled current having a half cycle sinusodial-like shape each switching cycle, wherein the power stage has a variable switching frequency, wherein the control circuit is operable to estimate an average sampled current for a present switching cycle by:

measuring the period of the immediately preceding switching cycle;

integrating a plurality of current samples of the sampled current while the high-side switch is off and the first low-side switch is on during the immediately preceding switching cycle;

calculating an average sampled current for the immediately preceding switching cycle by dividing the integrated sampled current by the measured period of the immediately preceding switching cycle; and estimating the average sampled current for the present switching cycle based upon the calculated average sampled current for the immediately preceding switching cycle.

2. The voltage converter of claim 1, wherein the control circuit is operable to measure the period of the immediately preceding switching cycle by:

resetting a counter at a rising edge of a gate signal applied to the high-side switch of the power stage at the beginning of the immediately preceding switching cycle; and saving the counter output at the end of the immediately preceding switching cycle.

3. The voltage converter of claim 1, wherein the control circuit is operable to integrate the plurality of current samples of the sampled current while the high-side switch is off and the first low-side switch is on during the immediately preceding switching cycle by:

resetting a counter at a falling edge of a gate signal applied to the high-side switch of the power stage at the beginning of the immediately preceding switching cycle; and saving the counter output at the end of the immediately preceding switching cycle.

4. The voltage converter of claim 1, wherein the control circuit is operable to sample current at a point between the switching node and the output node at a predetermined sampling rate which is set so that the number of samples taken each switching cycle ensures the average sampled current calculated for each switching cycle meets an accuracy threshold.

5. The voltage converter of claim 1, wherein the control circuit is further operable to adjust the average sampled current estimated for the present switching cycle so as to increase accuracy of the average sampled current estimate for the present switching cycle, the adjustment being based upon a measurement taken during the present switching cycle.

6. The voltage converter of claim 5, wherein the control circuit is operable to adjust the average sampled current estimated for the present switching cycle by:

determining if the high-side switch is on for a different duration of time in the present switching cycle than in the immediately preceding switching cycle; and adjusting the average sampled current estimated for the present switching cycle as a function of the difference in on-time for the high-side switch.

7. The voltage converter of claim 6, wherein the control circuit is operable to adjust the average sampled current estimated for the present switching cycle as a function of the difference in on-time for the high-side switch by:

multiplying the difference in on-time for the high-side switch by a weighting factor so as to compute an adjustment value; and adding the adjustment value to the average sampled current estimated for the present switching cycle.

8. The voltage converter of claim 5, wherein the control circuit is operable to adjust the average sampled current estimated for the present switching cycle by:

determining if the sampled current peaks at a different value in the present switching cycle than in the immediately preceding switching cycle; and adjusting the average sampled current estimated for the present switching cycle as a function of the difference in the peaks.

9. The voltage converter of claim 8, wherein the control circuit is operable to adjust the average sampled current estimated for the present switching cycle as a function of the difference in the peaks by:

multiplying the difference in the peaks by a weighting factor so as to compute an adjustment value; and adding the adjustment value to the average sampled current estimated for the present switching cycle.

10. The voltage converter of claim 1, wherein the passive circuit comprises an LC tank coupled to the switching node of the power stage and a transformer/tapped-inductor for coupling the LC tank to an output capacitor, wherein the power stage further comprises a second low-side switch coupled between the transformer/tapped-inductor and ground, and wherein the control circuit is operable to sample current of the second low-side switch for use in calculating the average sampled current for the immediately preceding switching cycle.

11. A method of current sensing for a voltage converter which includes a power stage having a high-side switch and a first low-side switch coupled to the high-side switch at a switching node of the power stage and a passive circuit coupling the switching node to an output node of the voltage converter, the power stage having a variable switching frequency, the method comprising:

sampling current at a point between the switching node and the output node, the sampled current having a half cycle sinusodial-like shape each switching cycle; and estimating an average sampled current for a present switching cycle by:

measuring the period of the immediately preceding switching cycle;

integrating a plurality of current samples of the sampled current while the high-side switch is off and the first low-side switch is on during the immediately preceding switching cycle, calculating an average sampled current for the immediately preceding switching cycle by dividing the integrated sampled current by the measured period of the immediately preceding switching cycle; and estimating the average sampled current for the present switching cycle based on the average sampled current calculated for the immediately preceding switching cycle.

12. The method of claim 11, wherein measuring the period of the immediately preceding switching cycle comprises:

resetting a counter at a rising edge of a gate signal applied to the high-side switch of the power stage at the beginning of the immediately preceding switching cycle; and saving the counter output at the end of the immediately preceding switching cycle.

13. The method of claim 11, wherein integrating the sampled current while the high-side switch is off and the first low-side switch is on during the immediately preceding switching cycle comprises:
   resetting a counter at a falling edge of a gate signal applied to the high-side switch of the power stage at the beginning of the immediately preceding switching cycle; and
   saving the counter output at the end of the immediately preceding switching cycle.

14. The method of claim 11, further comprising:
   adjusting the average sampled current estimated for the present switching cycle so as to increase accuracy of the average sampled current estimate for the present switching cycle, the adjustment being based upon a measurement taken during the present switching cycle.

15. The method of claim 14, wherein adjusting the average sampled current estimated for the present switching cycle comprises:
   determining if the high-side switch is on for a different duration of time in the present switching cycle than in the immediately preceding switching cycle; and
   adjusting the average sampled current estimated for the present switching cycle as a function of the difference in on-time for the high-side switch.

16. The method of claim 15, wherein adjusting the average sampled current estimated for the present switching cycle as a function of the difference in on-time for the high-side switch comprises:
   multiplying the difference in on-time for the high-side switch by a weighting factor so as to compute an adjustment value; and
   adding the adjustment value to the average sampled current estimated for the present switching cycle.

17. The method of claim 14, wherein adjusting the average sampled current estimated for the present switching cycle comprises:
   determining if the sampled current peaks at a different value in the present switching cycle than in the immediately preceding switching cycle; and
   adjusting the average sampled current estimated for the present switching cycle as a function of the difference in the peaks.

18. The method of claim 17, wherein adjusting the average sampled current estimated for the present switching cycle as a function of the difference in the peaks comprises:
   multiplying the difference in the peaks by a weighting factor so as to compute an adjustment value; and
   adding the adjustment value to the average sampled current estimated for the present switching cycle.

19. The method of claim 11, wherein the passive circuit comprises an LC tank coupled to the switching node of the power stage and a transformer/tapped-inductor coupling the LC tank to an output capacitor, wherein the power stage further comprises a second low-side switch coupled between the transformer/tapped-inductor and ground, and wherein sampling current at a point between the switching node and the output node comprises sampling current of the second low-side switch.

20. A voltage converter, comprising:
   a power stage comprising a high-side switch and a first low-side switch coupled to the high-side switch at a switching node of the power stage;
   a passive circuit coupling the switching node to an output node of the voltage converter; and
   a control circuit operable to control cycle-by-cycle switching of the power stage and sample current at a point between the switching node and the output node, the sampled current having a half cycle sinusodial-like shape each switching cycle,
   wherein the power stage has a variable switching frequency,
   wherein, for a present switching cycle, the control circuit is operable to calculate an average of a plurality of current samples of the sampled current for the immediately preceding switching cycle and estimate an average sampled current for the present switching cycle based on the average sampled current calculated for the immediately preceding switching cycle, and
   wherein the control circuit is further operable to adjust the average sampled current estimated for the present switching cycle so as to increase accuracy of the average sampled current estimate for the present switching cycle, the adjustment being based upon a measurement taken during the present switching cycle.

21. A method of current sensing for a voltage converter which includes a power stage having a high-side switch and a first low-side switch coupled to the high-side switch at a switching node of the power stage and a passive circuit coupling the switching node to an output node of the voltage converter, the power stage having a variable switching frequency, the method comprising:
   sampling current at a point between the switching node and the output node, the sampled current having a half cycle sinusodial-like shape each switching cycle;
   for a present switching cycle, calculating an average of a plurality of current samples of the sampled current for the immediately preceding switching cycle and estimating an average sampled current for the present switching cycle based on the average sampled current calculated for the immediately preceding switching cycle, and
   adjusting the average sampled current estimated for the present switching cycle so as to increase accuracy of the average sampled current estimate for the present switching cycle, the adjustment being based upon a measurement taken during the present switching cycle.

* * * * *